(12) United States Patent
Govindarajan et al.

(10) Patent No.: US 8,710,154 B2
(45) Date of Patent: Apr. 29, 2014

(54) NON-AQUEOUS SOLUTION PROCESS FOR THE PREPARATION OF CROSS-LINKED POLYMERS

(75) Inventors: Kanchivakkam Ramaswamy Govindarajan, Chennai (IN); Kalpattu Kuppasamy Balasubramanian, Chennai (IN); S. Bava Bohorudeen, Chennai (IN); Somasundaram Angalan, Chennai (IN); Kalivan Neelakandan, Chennai (IN)

(73) Assignee: Shasun Pharmaceuticals Limited, Chennai, IN (US)

( * ) Notice: Subject to any disclaimer, the term of this patent is extended or adjusted under 35 U.S.C. 154(b) by 241 days.

(21) Appl. No.: 13/119,061

(22) PCT Filed: Sep. 14, 2009

(86) PCT No.: PCT/IN2009/000506
§ 371 (c)(1),
(2), (4) Date: Mar. 15, 2011

(87) PCT Pub. No.: WO2010/029579
PCT Pub. Date: Mar. 18, 2010

(65) Prior Publication Data
US 2011/0196107 A1    Aug. 11, 2011

(30) Foreign Application Priority Data
Sep. 15, 2008 (IN) ................ 2234/CHE/2008

(51) Int. Cl.
*C08F 8/00* (2006.01)
*C08F 8/44* (2006.01)
*C08K 5/02* (2006.01)
*C08K 5/06* (2006.01)
*C08K 5/17* (2006.01)
*C08F 26/04* (2006.01)
*C08F 26/06* (2006.01)

(52) U.S. Cl.
USPC ............... 525/328.2; 525/326.7; 525/327.1; 525/359.1; 525/359.2; 525/359.5; 525/385; 525/386; 524/555

(58) Field of Classification Search
USPC ............ 525/327.1, 326.7, 328.2, 359.2, 385, 525/386, 359.1, 359.5; 524/555
See application file for complete search history.

(56) References Cited

U.S. PATENT DOCUMENTS

| | | | | |
|---|---|---|---|---|
| 4,626,577 | A * | 12/1986 | Harada | 525/369 |
| 7,229,613 | B2 * | 6/2007 | Burke et al. | 424/78.35 |
| 2006/0177415 | A1 * | 8/2006 | Burke | 424/78.27 |
| 2008/0085872 | A1 * | 4/2008 | Burke et al. | 514/52 |

FOREIGN PATENT DOCUMENTS

WO    WO 00/63259    * 10/2000

* cited by examiner

*Primary Examiner* — Fred M Teskin
(74) *Attorney, Agent, or Firm* — Lathrop & Gage LLP; Brian C. Trinque

(57) ABSTRACT

The present invention discloses a non-aqueous solution process for making cross-linked polymers. The cross-linked polymers are characterized by a repeat unit that includes at least one amino group. Amino groups can be part of the polymer backbone (e.g., polyethyleneimine), pendant from the polymer backbone (e.g., polyallylamine), or both types of amino groups can exist within the same repeat unit and/or polymer. The present invention discloses more specifically non-aqueous solution cross-linking to prepare Sevelamer and its salts, Colesevelam and its salts.

27 Claims, No Drawings

NON-AQUEOUS SOLUTION PROCESS FOR THE PREPARATION OF CROSS-LINKED POLYMERS

TECHNICAL FIELD

The present invention relates to an improved process for the preparation of cross-linked polymers. More specifically, the present invention relates to a process for the preparation of cross-linked polyallylamine polymers in non-aqueous medium. This application claims the benefit of Indian Provisional application No. 2234/CHE/2008 dated Sep. 15, 2008.

BACKGROUND OF THE INVENTION

Cross-linked polyallylamine polymers have found many therapeutic applications such as in reducing blood cholesterol levels by reducing reabsorbtion of bile acids (U.S. Pat. Nos. 5,168,530, 5,679,717, 5,693,675 and 5,607,669), decreasing the absorption of dietary iron from the gastrointestinal track (U.S. Pat. No. 5,702,696) and removing phosphate from the gastrointestinal track (U.S. Pat. No. 5,496,545). Further JP 05244915 discloses the use of cross-linked polyamine polymers as food preservatives. U.S. Pat. No. 6,290,947 describes the use of cationic polymers as toxin binding agents. The binding of one or more sugars by cross-linked hydrogel polymers are indicated in WO2001025291.

Cross-linked polyallylamine polymers having therapeutic applications include Sevelamer hydrochloride, Sevelamer carbonate and Colesevelam hydrochloride. Sevelamer Hydrochloride and Sevelamer carbonate are indicated for the control of serum phosphorus in patients with Chronic Kidney Disease (CKD) on hemodialysis. They are available in tablet form for oral use. These polymers are used to treat high blood levels of phosphorous in patients [hyperphosphatemia]. It binds phosphorous and prevents it from being absorbed into the blood stream. By binding phosphate in the gastrointestinal tract, Sevelamer hydrochloride and Sevelamer carbonate lowers the phosphate concentration in the serum. Colesevelam hydrochloride is a non-absorbed lipid lowering polymer that binds bile acids in the intestine, impeding their reabsorbtion. Colesevelam Hydrochloride is a novel polymeric hydrogel designed to treat cholesterol by binding the bile acids in the gastrointestinal tract. The bile acid bound gel is subsequently excreted in faeces. The cholesterol lowering action is derived from the body's use of cholesterol in the biosynthesis of bile acids to replace those that are excreted.

Methods to produce polyallylamine polymers and further cross-linking to produce cross-linked polymers are known. U.S. Pat. No. 4,528,347 discloses a process for producing a polymer of monoallylamine or a salt thereof by polymerizing an inorganic monoallylamine acid salt in a polar solvent in the presence of an azo type initiator. U.S. Pat. No. 4,626,577 discloses a process for making the methanolic solution of polyallylamine by treating powdered polyallylamine hydrochloride with methanolic solution of caustic alkali/ammonia by complete neutralisation. These methods however do not describe the preparation of cross-linked polymers such as Sevelamer Hydrochloride, Sevelamer carbonate and Colesevelam hydrochloride.

U.S. Pat. No. 4,605,701 discloses a process for preparing cross-linked polymer wherein cross-linking is performed with partially neutralised aqueous solution of polyallylamine using liquid medium that is immiscible with aqueous solvents. One of the difficulties in this process is that this process employs aliphatic or aromatic hydrocarbons for use as the liquid medium. Such hydrocarbons may be hazardous and expensive to dispose off. Another difficulty is that the polymerization process results in a high volume of effluents making the process difficult in terms of operation and batch cycle time. Since the polymerization occurs in heterogeneous immiscible phases, achieving consistency in the cross-linked product would depend upon number of process parameters such as mixing. It is highly important to have consistency in product quality to meet the requirements of drug product. Hence there is need to improve the process which would give product of consistent quality.

U.S. Pat. No. 6,083,495 covers an aqueous process to make Sevelamer hydrochloride from the polyallylamine hydrochloride polymer. It uses an aqueous alkaline solution for making the cross-linked polyallylamine, wherein the polyallylamine is reacted with a difunctional cross-linking agent in an aqueous alkaline solution to get the cross-linked polymer gel. Cross-linking in aqueous medium is associated with issues such as solubility of cross-linking agent as well as stoichiometric adjustment to achieve desired level of cross-linking.

U.S. Pat. No. 6,180,754 covers a process to make Sevelamer hydrochloride using a special type of reactor known as LIST reactor. It discloses a process for producing a cross-linked polyallylamine polymer by reacting a reduced salt, aqueous solution of a polyallylamine polymer with a multi-functional cross-linking agent in a special LIST reactor to give a cross-linked polyallylamine polymer. It also covers a process for producing a cross-linked polyallylamine polymer by (a) partially neutralizing an aqueous solution of polyallylamine hydrochloride polymer with aqueous sodium hydroxide, (b) ultrafiltering the partially neutralized, aqueous solution of polyallylamine polymer to give a reduced salt, aqueous solution of polyallylamine polymer, (c) concentrating the reduced salt, aqueous solution of polyallylamine polymer, (d) reacting the reduced salt, aqueous solution of polyallylamine polymer with epichlorohydrin in a LIST reactor to give a cross-linked polyallylamine polymer, (e) drying the cross-linked polyallylamine polymer in a LIST reactor, (f) grinding and sieving the cross-linked polyallylamine polymer, and (g) isolating the cross-linked polyallylamine polymer.

U.S. Pat. No. 6,362,266 discloses a method for producing a cross-linked polyallylamine polymer by (a) reacting an aqueous solution of a polyallylamine polymer with a multi-functional cross-linking agent to give a cross-linked polyallylamine polymer; (b) washing this aqueous solution of cross-linked polyallylamine polymer with an alcohol/water solution; (c) adding a surfactant to the washed cross-linked polyallylamine polymer; (d) drying the cross-linked polyallylamine polymer; (e) grinding and sieving the cross-linked polyallylamine polymer; and (f) isolating the cross-linked polyallylamine polymer.

U.S. Pat. No. 6,525,113 discloses a process for manufacturing cross-linked polymer involving mixing (a) polyallylamine hydrochloride (b) water (c) a hydroxide/alkoxide (d) a water-miscible organic solvent/co-solvent and (e) adding a cross-linking agent to form a cross-linked polyallylamine.

U.S. Pat. No. 6,600,011 relates to methods for purifying and drying an organic polymer hydrogel by washing the polymer hydrogel with a water wash medium and then spray drying the resulting slurry.

These aforementioned methods to produce cross-linked polymers have several disadvantages such as achieving desired industrial scale and consistency in product quality. The cross-linked product obtained from known methods requires intensive purification to produce desired quality of product on industrial scale. Hence, there is a need to provide an improved process for the preparation of cross-linked amine polymers which can overcome the above mentioned drawbacks.

SUMMARY OF THE INVENTION

The disclosure provides a process for the preparation of cross-linked polymer or a salt form thereof comprising steps of neutralizing amine acid addition salt polymer to amine polymer which comprises repeating unit of formula selected from group consisting of:

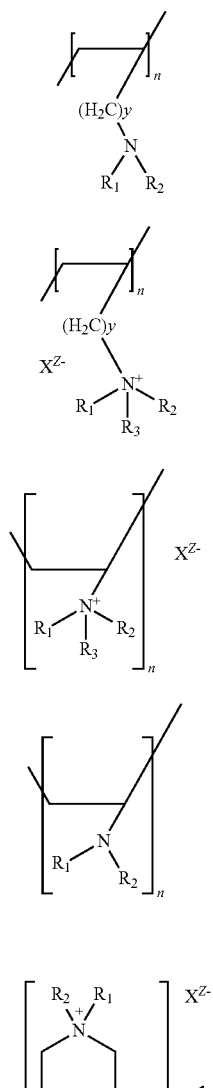

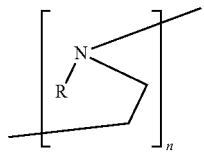

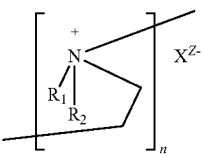

where n is a positive integer and y is an integer of one or more, z is a positive integer of 1, 2 or 3, each R, R1, R2 and R3, independently, is H or a substituted or unsubstituted alkyl group, and XZ- is an exchangeable negatively charged counterion; and cross-linking said neutralized amine polymer with a cross-linking agent to obtain cross-linked polymer wherein cross-linking is performed in non-aqueous medium.

In certain embodiments, said amine polymer is selected from polyethyleneimine, polyallylamine, polydiallylamine and polyvinylamine. In other embodiments, said amine polymer is polyallylamine.

In other embodiments, said amine acid addition salt polymer is selected from the group of chloride, bromide, iodide, hydrogen sulphate, sulphate, hydrogen carbonate, carbonate, nitrate, hydroxide, persulfate, sulfite, acetate, lactate, succinate, propionate, oxalate, butyrate, ascorbate, citrate, dihydrogen citrate, tartrate, taurocholate, glycocholate, cholate, hydrogen citrate, maleate, benzoate and folate salt of said amine polymer. In certain specific embodiments, said amine acid addition salt polymer is hydrochloride salt of said amine polymer. In other specific embodiments, said amine acid addition salt polymer is hydrochloride salt of polyallylamine.

In other embodiments, said cross-linking agent is selected from the group of acrylol chloride, epichlorohydrin, butanedioldiglycidyl ether, 1,3-dichloropropane, 1,2-dichorothane, 1,3-dibromepropan, succinyl dichloride, dimethylsuccinate and pyromellitic dianhydride. In certain specific embodiments, said cross-linking agent is epichlorohydrin.

In other embodiments, the neutralization of said amine acid addition salt is carried out using base. In certain specific embodiments, said base is selected from hydroxide, alkoxide, carbonate, bicarbonate, amine and ammonia. In other specific embodiments, said base is hydroxide.

In other embodiments, said amine acid addition salt is neutralised to the extent of 40%-85%, 50%-75% or of 60%-70%.

In other embodiments, the cross-linking is carried out in the temperature range of 0° C.-100° C., 30° C.-79° C. or 50° C.-60° C.

In other embodiments, the cross-linking is carried out in alcoholic solvents. In certain specific embodiments, the cross-linking is carried out in methanol or ethanol.

In other embodiments, said cross-linking agent is used in about 1% to about 15% by weight of said amine acid addition salt polymer. In certain specific embodiments said cross-linking agent is used in about 6% to about 13% weight of said amine acid addition salt polymer for the preparation of phosphate binding polymer like Sevelamer and its salts. In other specific embodiments, said cross-linking agent is used in about 1% to about 6% weight of said amine acid addition salt polymer for the preparation of bile acid binding polymer like Colesevelam and its salts.

In other embodiments, preparation of Sevelamer hydrochloride comprises: neutralizing polyallylamine hydrochloride to polyallylamine; and cross-linking said neutralized polyallylamine with epichlorohydrin to obtain Sevelamer hydrochloride, wherein cross-linking is performed in non-aqueous medium. In certain specific embodiments, Sevelamer hydrochloride has phosphate binding capacity in the range of about 4.7 to 6.5 mmol/g.

In other embodiments, the process also includes alkylation and quaternization to yield further cross-linked polymer. In certain specific embodiments, the preparation of Colesevelam hydrochloride comprises neutralizing polyallylamine hydrochloride to polyallylamine; cross-linking said neutralized polyallylamine with epichlorohydrin in non-aqueous medium to obtain cross-linked polymer. wherein cross-linking is performed in non-aqueous medium; and alkylating with 1-bromodecane and quaternizing with 6-Bromohexyltrimethyl Ammonium bromide to obtain Colesevelam hydrochloride. In other specific embodiments, the Colesevelam hydrochloride has bile acid binding capacity in the range of about 1.6 g/g to about 2.6 g/g with respect to Glycocholic acid.

OBJECTIVE OF THE INVENTION

The objective of the instant invention is to provide an improved process for cross-linking amine polymer. Another objective of the instant invention is to provide an improved process which produces consistent and quality product at industrial scale.

Another objective of the instant invention is to prepare cross-linked polymers in non-aqueous medium and more specifically to prepare cross-linked polyallylamine polymers. Another objective of the instant invention is to provide a process which comprises the steps of neutralizing amine acid addition salt polymer and cross-linking neutralized amine polymer with cross-linking agent in non-aqueous medium to give cross-linked polymer.

Another objective of the instant invention is to develop an industrially efficient method for the preparation of cross-linked polymers.

Another objective of the instant invention is to prepare further cross-linked polymers by subjecting the pure form of the said above polymers to alkylation and quaternization.

Another objective of the instant invention is to prepare cross-linked polyallylamine polymers such as Sevelamer hydrochloride, Sevelamer carbonate and Colesevelam hydrochloride.

DETAILED DESCRIPTION OF THE INVENTION

The instant invention discloses an improved process for cross-linking amine polymer. The instant invention discloses a non-aqueous solution process for making cross-linked polymers. The cross-linked polymers are characterized by a repeat unit that includes at least one amino group. Amino groups can be part of the polymer backbone (e.g., polyethyleneimine), pendant from the polymer backbone (e.g. polyallylamine), or both types of amino groups can exist within the same repeat unit and/or polymer. Amine polymers include aliphatic amine polymers and aromatic amine polymers.

An aliphatic amine polymer used in the invention is a polymer which is manufactured by polymerizing an aliphatic amine monomer. Preferably these polymers are characterized by one or more monomeric units characterized by one or more repeat units set forth below:

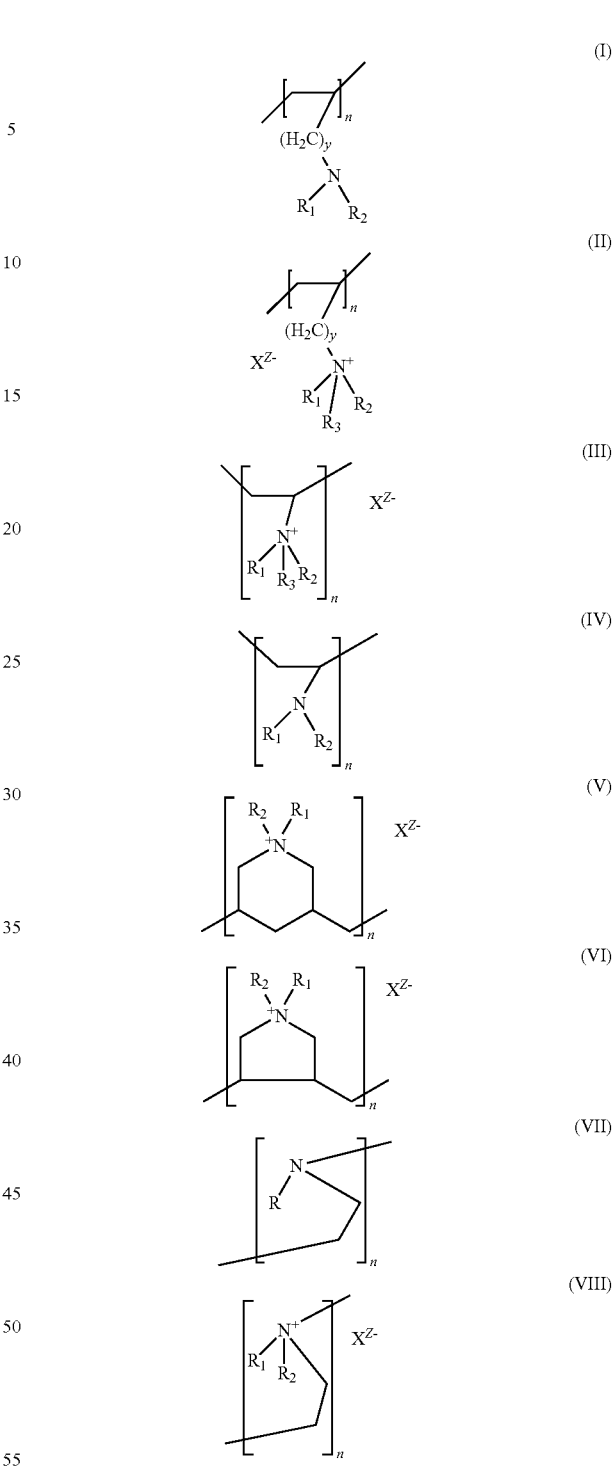

or a salt or copolymer thereof, where n is a positive integer, y is an integer of one or more (e.g., between about one and about 10, preferably between one and four, more preferably one), z is a positive integer of 1, 2 or 3 and each R, R1, R2, and R3, independently, is H or a substituted or unsubstituted alkyl group (e.g., having between 1 and 25 or between 1 and 5 carbon atoms, inclusive), alkylamino (e.g., having between 1 and 5 carbons atoms, inclusive, such as ethylamino or poly (ethylamino)) or aryl (e.g., phenyl) group, and each $X^{z-}$ is an exchangeable negatively charged counterion.

In one of the preferred polymer used in the invention, at least one of the R, R1, R2, or R3 is a hydrogen atom. In a more preferred embodiment, each of these groups is hydrogen. In another embodiments, R, R1, R2, and R3 are —H and the polymer comprises repeat units characterized by Structural Formulas (I) (II), (III), (IV), (V), (VI), (VII), and/or (VIII).

Examples of suitable counterions include organic ions, inorganic ions, or a combination thereof, such as halides ($Cl^-$, $Br^-$ and $I^-$), $CH_3OSO_3^-$, $HSO_4^-$, $SO_4^{2-}$, $HCO_3^-$, $CO_3^{2-}$, nitrate, hydroxide, persulfate, sulfite, acetate, lactate, succinate, propionate, oxalate, butyrate, ascorbate, citrate, dihydrogen citrate, tartrate, taurocholate, glycocholate, cholate, hydrogen citrate, maleate, benzoate, folate, an amino acid derivative, a nucleotide, a lipid, or a phospholipid. Preferred ions are chloride, carbonate and bicarbonate. The counterions can be the same as, or different from, each other. For example, the polymer can contain two different types of counterions.

The preferred polymers which could be prepared from instant invention comprise water-insoluble, non-absorbable, cross-linked polyamines and optionally alkylated and quaternized cross-linked polymers. Preferred polymers used in instant invention for cross-linking are aliphatic. Examples of preferred polymers used in instant invention for cross-linking include polyethyleneimine, polyallylamine, polyvinylamine and polydiallylamine polymers. Among the preferred polymers, polyallylamines are the most preferred ones. The polymers can be homopolymers or copolymers and can be substituted or unsubstituted.

In preferred embodiment of present invention polyallylamine can be protonated with organic or inorganic acids comprising physiologically acceptable anions. A polyallylamine polymer can comprise more than one type of anion. Examples of suitable anions include halides ($Cl^-$, $Br^-$ and $I^-$), $CH_3OSO_3^-$, $HSO_4^-$, $SO_4^{2-}$, $HCO_3^-$, $CO_3^{2-}$, nitrate, hydroxide, persulfate, sulfite, acetate, lactate, succinate, propionate, oxalate, butyrate, ascorbate, citrate, dihydrogen citrate, tartrate, taurocholate, glycocholate, cholate, hydrogen citrate, maleate, benzoate, folate, an amino acid derivative, a nucleotide, a lipid, or a phospholipid. Chloride, carbonate and bicarbonate are preferred anions. The counter anions can be the same as or different from each other. For example, the polymer can contain two or more different types of counter anions.

The polyallylamine acid addition salt used in the present invention can be prepared by known processes such as the process disclosed in U.S. Pat. No. 4,626,577 which is incorporated herein for reference.

The polyamines salts are cross-linked with suitable cross-linking agents to obtain water-insoluble, non-absorbable cross-linked polyamines salts. The preferred polyamine salts for cross-linking are chosen from polyethyleneimine, polyallylamine, polyvinylamine and polydiallylamine polymers. Among the preferred polymers, polyallylamines are the most preferred ones. The suitable cross-linking agents used in the present invention include acrylol chloride, epichlorohydrin, butanedioldiglycidyl ether, 1,3-dichloropropane, 1,2-dichorothane, 1,3-dibromepropan, succinyl dichloride, dimethylsuccinate and pyromellitic dianhydride. A preferred cross-linking agent is epichlorohydrin. The cross-linking agent can be used in various quantities depending upon the desired end product.

The process of instant invention comprises of:
a) neutralizing amine acid addition salt polymer to amine polymer
b) cross-linking said neutralized amine polymer with a cross-linking agent to obtain cross-linked polymer
wherein cross-linking is performed in non-aqueous medium.

The amine acid addition salt polymer which could also be referred to as polyamine acid addition salts is neutralized in non aqueous solvents. The by-products of neutralization are insoluble in non-aqueous solvents while the amine polymer remains in the solution. This facilitates the removal of the by-products by filtration. Where as neutralization in aqueous solution results in both neutralised amine polymer and by-products dissolved in the solution. Separation of by-product and neutralised amine from aqueous solution requires techniques such as ultrafiltration. Moreover removal of these by-products at the early stage simplifies the separation of the by-products from cross-linked polymer. By-products removal from the cross-linked polymer is difficult at the later stage as these by-products are encapsulated in the cross-linked polymers which requires multiple washings.

Non-aqueous solvents for the neutralization and cross-linking are chosen from those which would preferably have relative solubility for the base and amine polymer. The by-products of neutralization are less soluble or vice-versa so as the by-products could be separated from the amine polymers before cross-linking.

The volume of the solvent for cross-linking could be between 1 to 10 times by weight of amine acid salt polymers. The volume of the solvent could be adjusted appropriately before cross-linking either by distillation or by dilution. Preferably the volume of the solvent is adjusted to 1 to 6 times by weight of amine salt polymer and most preferably the volume of the solvent is adjusted to 1 to 3 times by weight of amine salt polymer.

In a preferred embodiment, preferred solvent for neutralization are alcohols or mixture of alcohols. Among the alcohols most preferred ones are methanol and ethanol and their mixtures.

For neutralization the bases could be chosen from alkoxides, hydroxides, carbonates, bicarbonates, aliphatic amines, aromatic amines and ammonia. The preferred bases are chosen from alkoxides and hydroxides. Preferably alkoxides or hydroxides for neutralization are dissolved in alcohols. The preferred alkoxides and hydroxides are chosen from sodium or potassium alkoxides and hydroxides. The most preferred ones are sodium hydroxide, potassium hydroxide dissolved in methanol.

Neutralization of amine acid salt polymers preferably polyallylamine hydrochloride is carried out using a base to the extent of about 40%-85% of amine acid salt polymer. Preferably to the extent of 50%-75% of amine acid salt polymer more preferably to the extent of 60%-70% amine acid salt polymer.

The cross-linking reaction is carried out at the temperature range 0° C.-100° C. and preferably in the range 30° C.-70° C. and more preferably at 50° C.-60° C. The agitation during the cross-linking stage preferably be kept slow in order to achieve desired level of cross-linking, as vigorous agitation during cross-linking results in improper gel formation.

The non-aqueous solvents in preferred embodiments of this invention are in which both the amine polymer and cross-linking agents are soluble which facilities a smooth cross-linking rather than a cross-linking in aqueous solvents in which cross-linking agents have poor solubility.

Another advantage of cross-linking in the solvents of the instant invention results in smooth cross-linking thus avoids formation of polymer blocks which can cause damages to the equipment and stirrer.

In one of the embodiment of the present invention polyallylamine hydrochloride is neutralized in non-aqueous solvents. The by-products of neutralization are insoluble in non-aqueous solvents. This facilitates the removal of the by-products by filtration. The neutralization in aqueous solution results in both neutralised amine polymer and by-products dissolved in the solution.

The preferred solvents of the instant invention are alcohols or mixture of alcohols. Among the alcohols methanol and ethanol and their mixtures are the most preferred.

Neutralization of amine acid salt polymers preferably polyallylamine hydrochloride is carried out using a base. For neutralization the bases could be chosen from alkoxides, hydroxides, carbonates, bicarbonates, aliphatic amines, aromatic amines and ammonia. The preferred bases are chosen from alkoxides and hydroxides. The preferably alkoxides or hydroxides for neutralization are dissolved in alcohols. The preferred alkoxides and hydroxides are chosen from sodium or potassium alkoxides and hydroxides. The most preferred one are sodium hydroxide, potassium hydroxide dissolved in methanol.

Neutralization of amine acid salt polymers preferably polyallylamine hydrochloride is carryout using a base to the extent of about 40%-85% of polyallylamine hydrochloride. Preferably to the extent of 50%-75% of polyallylamine hydrochloride more preferably to the extent of 60%-70% polyallylamine hydrochloride.

Neutralization of amine acid salt polymers preferably polyallylamine hydrochloride produces by-products of corresponding salts. The corresponding salt of neutralization of polyallylamine hydrochloride with sodium hydroxide in methanol produces the by-product sodium chloride. The by-product sodium chloride is insoluble in methanol. The insoluble sodium chloride is removed by filtration to get methanolic solution of neutralised polyallylamine which is carried forward for the cross-linking.

The volume of the solvent for cross-linking could be between 1 to 10 times by weight of polyallylamine hydrochloride. The volume of the solvent could be adjusted appropriately before cross-linking either by distillation or by dilution. Preferably the volume of the solvent is adjusted to 1 to 6 times by weight of polyallylamine hydrochloride and most preferably the volume of the solvent is adjusted to 1 to 3 times by weight of polyallylamine hydrochloride.

Suitable cross-linking agents used in the present invention include acrylol chloride, epichlorohydrin, butanedioldiglycidyl ether, 1,3-dichloropropane, 1,2-dichorothane, 1,3-dibromepropan, succinyl dichloride, dimethylsuccinate and pyromellitic dianhydride. A preferred cross-linking agent is epichlorohydrin.

The cross-linker, preferably epichlorohydrin can be used in various quantities depending upon the desired end product. For example, for Sevelamer and its salts, epichlorohydrin is used in the range 6%-13% by weight of polyallylamine hydrochloride, whereas for Colesevelam and its salts, epichlorohydrin is used in the range 1%-6% by weight of polyallylamine hydrochloride. Thus 1% to 6% cross-linked polymer obtained is further alkylated with 1-bromodecane and quaternized with 6-bromohexyltrimethylammonium bromide to get Colesevelam and its salts.

The cross-linking reaction is carried out at the temperature range 0° C.-100° C. and preferably in the range 30° C.-70° C. and more preferably at 50° C.-60° C. The agitation during the cross-linking stage preferably be kept slow in order to achieve desired level of cross-linking, vigorous agitation during cross-linking results in improper gel formation.

The cross-linking is carried out in conventional reactor preferably it has smooth polished surface for example such as glass lined reactor. The reactor could be fitted with conventional agitators preferably anchor to have low sheering force and good sweeping and mixing, during the cross-linking. The cross-linking may preferably be carried out under inert atmosphere, for example under nitrogen atmosphere.

During cross-linking the reaction mass becomes a soft gel, thus formed soft gel is cured at 20 to 35° C. over an organic co-solvent. The organic co-solvent used in the present invention is usually chosen such that it is miscible with the solvent used for cross-linking. Preferably the organic co-solvent is selected from the group consisting of chlorobenzene, dichlorobenzene, acetonitrile, and acetone. More preferably, the co-solvent is acetonitrile. The presence of a co-solvent improves the nature of gel during curing, thus eliminating any isolation issues like slow filtration.

The cured gel is separated from solvent and co-solvent by standard techniques such as filtration, decantation, and centrifugation etc. The gel is then dispersed in water or with a mixture of water and water miscible solvents under slow agitation.

The gelation in the present process takes place quickly and the polymer gel is stirred gently and kept for curing as such at 25° C.-35° C. temp over a co-solvent like acetonitrile. After curing, the solvent is decanted off, which can be done easily as the gel settles down at the bottom of the vessel. To this, water or a mixture of water and a water miscible solvent is added and stirred gently, wherein the gel gets slowly swollen and broken down into a filterable material. The product is washed with water and dried. Prior to drying product is optionally washed with alcohols to facilitate drying.

The details of the invention, its objective and advantages are explained hereunder in greater details by way of example and it is to be understood that the invention, as fully described herein is not intended to be limited by the examples mentioned herein.

EXAMPLES

Example 1

Preparation of Sevelamer Hydrochloride (a) Preparation of Polyallylamine Hydrochloride 250 gm Allylamine is added drop wise to a cooled solution of concentrated hydrochloric acid [400 ml]. The temperature is maintained between 0°-5° C. After completion of addition, water is distilled out from the reaction mass under low pressure at 50°-60° C. The reaction mass is cooled to room temperature under nitrogen atmosphere. 0.5 gm Azobis amidinipropane dihydrochloride suspended in 11 ml of water is then added and the reaction mass is heated to 50° C. under nitrogen atmosphere for 24 hours. Another lot of Azobis amidinipropane dihydrochloride is added and heating is continued under nitrogen atmosphere for 44 hours. 100 ml distilled water is added to the reaction mass and stirred at 50° C. for 15 minutes, and then slowly cooled to room temperature. This aqueous solution is quenched drop wise in to pre-cooled 4.18 liters methanol below 10° C. under nitrogen atmosphere. The precipitated solid is isolated by filtration and in nitrogen atmosphere leeched with 4.18 liters methanol two times. The polyallylamine hydrochloride is dried at 50° C. for 18 hours under vacuum. Yield obtained: 220 grams.

(b) Preparation of Sevelamer Hydrochloride

Solid sodium hydroxide [12.85 grams] is added to 318 ml of methanol under nitrogen atmosphere and stirred for dissolution. 50 grams of polyallylamine hydrochloride [from example 1(a)] is added at room temperature to above solution and stirred at 50° C. under nitrogen atmosphere for 8 hours. The precipitated sodium chloride is filtered under vacuum and the filtrate is concentrated to about half of its volume, under vacuum. 4.5 g of epichlorohydrin is added to the concentrate, and gently stirred till the reaction mass becomes a rubbery mass. 150 ml of Acetonitrile is added to the gel. The reaction mass is gently stirred and cured for 18 hours as such at room temperature. The solvent mixture is decanted off and 670 ml distilled water is added to the rubbery residue and stirred gently till the gel is dispersed into a fine solid particles. The solid is collected by filtration and washed with 670 ml of distilled water twice under mechanical stirring. Sevelamer hydrochloride thus obtained is leeched with Isopropyl alcohol (1200 ml) for 30 minutes. The product is dried under high vacuum at 50° C. for 18 hours.

Result: White, brittle solid Sevelamer hydrochloride (35 grams). The phosphate binding capacity is 5.7 mmol/g. Total titrable amines, when tested by acid-base titration indicated 11.9 mmol per gram of the polymer on dried basis. The infra-red spectrum of the sample thus produces matched well with that of a sample extracted from the reference drug product.

Example 2

Preparation of Sevelamer Hydrochloride

Polyallylamine hydrochloride is prepared similar to Example 1(a). Then cross-linking is done in ethanol instead of methanol similar to Example 1(b).

Result: White, brittle solid (28 grams). The phosphate binding capacity is 5.5 mmol/g.

Example 3

Preparation of Sevelamer Hydrochloride

Polyallylamine hydrochloride is prepared similar to Example 1(a). Then cross-linking is done with epichlorohydrin using sodium methoxide (17.3 grams) instead of sodium hydroxide similar to Example 1(b).

Result: White, brittle solid (33 grams). The phosphate binding capacity is 5.8 mmol/g.

Example 4

Preparation of Colesevelam Hydrochloride

Cross-linked polymer is prepared similar to Example 1(b), using 2 g of epichlorohydrin. The resultant cross-linked polymer is further alkylated with 33.0 g of 1-bromodecane and 48.3 g of 6-bromohexyltrimethylammonium bromide under known reaction conditions. The isolated product, namely Colesevelam HCl (65 g) showed a bile acid binding capacity of 2.3 g/g when tested with Glycocholic acid. This value matches with that of reference drug product.

We claim:

1. A process for the preparation of a cross-linked polymer or a salt form thereof comprising steps of:
   a) neutralizing an amine acid addition salt polymer to an amine polymer which comprises a repeating unit of formula selected from group consisting of:

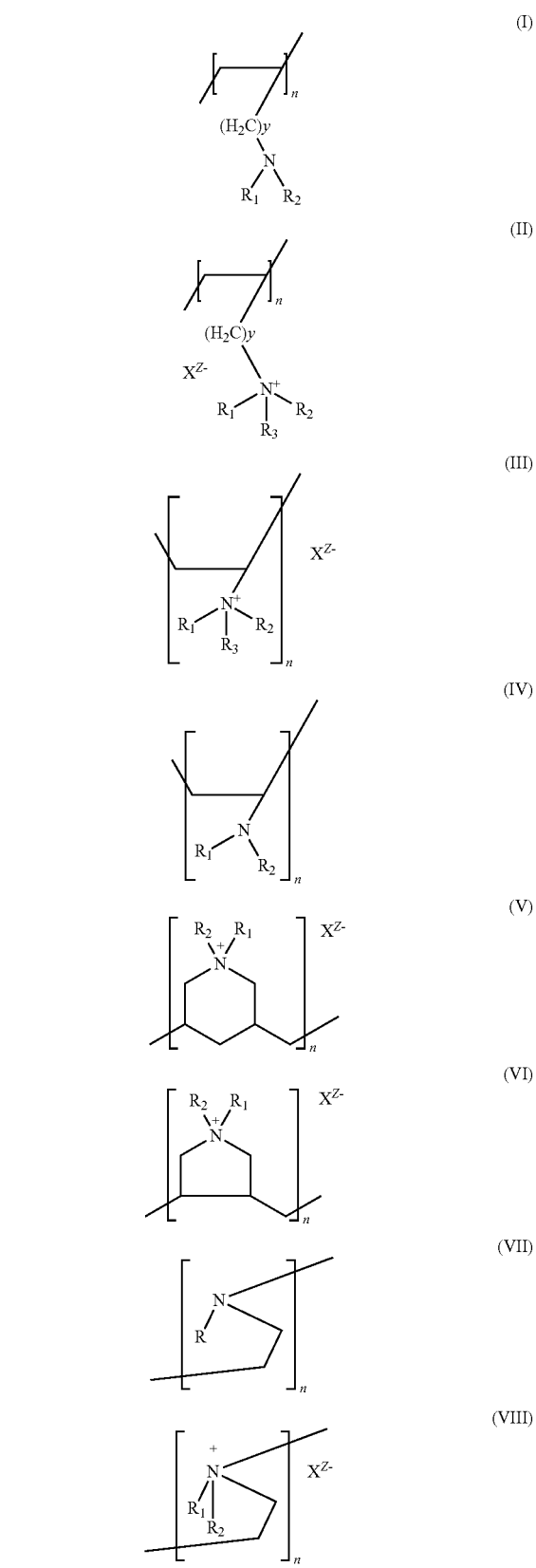

where n is a positive integer, y is an integer of one or more, z is a positive integer of 1, 2 or 3, each of R, R1, R2 and R3, independently, is H or a substituted or unsubstituted alkyl group, and XZ- is an exchangeable negatively charged counterion; and b) cross-linking said neutralized amine polymer with a cross-linking agent to obtain cross-linked polymer wherein cross-linking is performed in non-aqueous medium.

2. The process of claim 1 wherein said amine polymer is selected from polyethyleneimine, polyallylamine, polydiallylamine and polyvinylamine.

3. The process of claim 2 wherein said amine polymer is polyallylamine.

4. The process of claim 1 wherein said amine acid addition salt polymer is selected from the group of chloride, bromide, iodide, hydrogen sulphate, sulphate, hydrogen carbonate, carbonate, nitrate, hydroxide, persulfate, sulfite, acetate, lactate, succinate, propionate, oxalate, butyrate, ascorbate, citrate, dihydrogen citrate, tartrate, taurocholate, glycocholate, cholate, hydrogen citrate, maleate, benzoate and folate salt of said amine polymer.

5. The process of claim 4 wherein said amine acid addition salt polymer is a hydrochloride salt of said amine polymer.

6. The process of claim 5 wherein said amine acid addition salt polymer is a hydrochloride salt of polyallylamine.

7. The process of claim 1 wherein said cross-linking agent is selected from the group of acrylol chloride, epichlorohydrin, butanedioldiglycidyl ether, 1,3-dichloropropane, 1,2-dichorothane, 1,3-dibromepropan, succinyl dichloride, dimethylsuccinate and pyromellitic dianhydride.

8. The process of claim 7 wherein said cross-linking agent is epichlorohydrin.

9. The process of claim 1 wherein the neutralization of said amine acid addition salt is carried out using a base.

10. The process of claim 9 wherein said base is selected from hydroxide, alkoxide, carbonate, bicarbonate, amine and ammonia.

11. The process of claim 10 wherein said base is hydroxide.

12. The process of claim 1 wherein said amine acid addition salt is neutralised to the extent of 40%-85%.

13. The process of claim 12 wherein said amine acid addition salt is neutralised to the extent of 50%-75%.

14. The process of claim 13 wherein said amine acid addition salt is neutralised to the extent of 60%-70%.

15. The process of claim 1 wherein the cross-linking is carried out in the temperature range of 0° C.-100° C.

16. The process of claim 15 wherein the cross-linking is carried out in the temperature range of 30° C.-79° C.

17. The process of claim 16 wherein the cross-linking is carried out in the temperature range of 50° C.-60° C.

18. The process of claim 1 wherein the cross-linking is carried out in alcoholic solvents.

19. The process of claim 18 wherein the cross-linking is carried out in methanol or ethanol.

20. The process of claim 7 wherein said cross-linking agent is used in about 1% to about 15% by weight of said amine acid addition salt polymer.

21. The process of claim 20 wherein said cross-linking agent is used in about 6% to about 13% weight of said amine acid addition salt polymer for the preparation of, Sevelamer and its salts.

22. The process of claim 20 wherein said cross-linking agent is used in about 1% to about 6% weight of said amine acid addition salt polymer for the preparation of Colesevelam and its salts.

23. The process of claim 1 wherein preparation of Sevelamer hydrochloride comprises:

a) neutralizing polyallylamine hydrochloride to polyallylamine; and b) cross-linking said neutralized polyallylamine with epichlorohydrin to obtain Sevelamer hydrochloride, wherein the cross-linking is performed in non-aqueous medium.

24. The process of claim 23 wherein Sevelamer hydrochloride has a phosphate binding capacity in the range of about 4.7 to 6.5 mmol/g.

25. The process of claim 1, further comprising alkylation and quaternization to yield a further cross-linked polymer.

26. The process of claim 25 wherein preparation of Colesevelam hydrochloride comprises:

a) neutralizing polyallylamine hydrochloride to polyallylamine;

b) cross-linking said neutralized polyallylamine with epichlorohydrin in a non-aqueous medium to obtain cross-linked polymer, wherein the cross-linking is performed in non-aqueous medium; and c) alkylating with 1-bromodecane and quaternizing with 6-Bromohexyltrimethyl Ammonium bromide to obtain Colesevelam hydrochloride.

27. The process of claim 26 wherein Colesevelam hydrochloride has bile acid binding capacity in the range of about 1.6 g/g to about 2.6 g/g with respect to Glycocholic acid.

* * * * *